United States Patent
Titz

(10) Patent No.: US 10,457,172 B2
(45) Date of Patent: Oct. 29, 2019

(54) LOWER GUIDE FRAME OF A VERTICAL SUSPENSION SYSTEM, SLIDING SEAT GUIDE OF A VEHICLE SEAT, VERTICAL SUSPENSION SYSTEM FOR A VEHICLE SEAT, AND VEHICLE SEAT

(71) Applicant: ISRINGHAUSEN GmbH & Co. KG, Lemgo (DE)

(72) Inventor: Winfried Titz, Detmold (DE)

(73) Assignee: ISRINGHAUSEN GmbH & Co. KG, Lemgo (DE)

( * ) Notice: Subject to any disclaimer, the term of this patent is extended or adjusted under 35 U.S.C. 154(b) by 0 days.

(21) Appl. No.: 15/647,568

(22) Filed: Jul. 12, 2017

(65) Prior Publication Data

US 2018/0015857 A1 Jan. 18, 2018

(30) Foreign Application Priority Data

Jul. 12, 2016 (DE) .................. 10 2016 008 379

(51) Int. Cl.
*B60N 2/50* (2006.01)
*B60N 2/07* (2006.01)
*B60N 2/54* (2006.01)

(52) U.S. Cl.
CPC .......... *B60N 2/508* (2013.01); *B60N 2/0705* (2013.01); *B60N 2/502* (2013.01); *B60N 2/505* (2013.01); *B60N 2/509* (2013.01); *B60N 2/54* (2013.01)

(58) Field of Classification Search
CPC ...... B60N 2/508; B60N 2/0705; B60N 2/502; B60N 2/505; B60N 2/509; B60N 2/54; B60N 2/07; B60N 2/0702; B60N 2/072

USPC ......................................................... 248/588
See application file for complete search history.

(56) References Cited

U.S. PATENT DOCUMENTS

| | | | | |
|---|---|---|---|---|
| 4,068,887 A | * | 1/1978 | Babbs | B60N 2/0705 248/393 |
| 4,262,963 A | * | 4/1981 | Bauer | B60N 2/072 248/429 |
| 4,483,504 A | * | 11/1984 | Duwelshoft | B60N 2/072 248/429 |
| 4,940,285 A | * | 7/1990 | Suzuki | B60N 2/072 248/430 |
| 5,286,076 A | * | 2/1994 | DeVoss | B60N 2/0705 248/429 |
| 5,322,348 A | * | 6/1994 | Johnson | B60N 2/0705 248/430 |

(Continued)

FOREIGN PATENT DOCUMENTS

DE 102013205096 A1 5/2014
GB 2014444 B 9/1982

*Primary Examiner* — Christopher Garft
(74) *Attorney, Agent, or Firm* — Abelman, Frayne & Schwab

(57) ABSTRACT

A lower guide frame for a vertical suspension system of a vehicle seat having a left-hand slide and, parallel thereto, a right-hand slide which are connected to each other via a lower crosspiece. Attached to an upper side of at least one slide is a reinforcing profile which has a horizontal portion, via which it is connected to the upper side of one slide, and adjoining the horizontal portion is an oblique portion that is oriented obliquely downwards and outward. Adjoining the oblique portion is a vertical portion that, in the assembled state, extends to just above a vehicle floor.

21 Claims, 6 Drawing Sheets

(56) References Cited

U.S. PATENT DOCUMENTS

| | | | | |
|---|---|---|---|---|
| 5,755,422 | A | * | 5/1998 | Susko ................. B60N 2/0705 248/430 |
| 5,785,387 | A | * | 7/1998 | Hernandez ........... B60N 2/0705 248/429 |
| 8,303,037 | B2 | | 11/2012 | Weber et al. |
| 2002/0033625 | A1 | | 3/2002 | Goy et al. |
| 2016/0144746 | A1 | * | 5/2016 | Couasnon ............ B60N 2/0705 384/34 |
| 2016/0355106 | A1 | * | 12/2016 | Nozue ............... B60N 2/01583 |

* cited by examiner

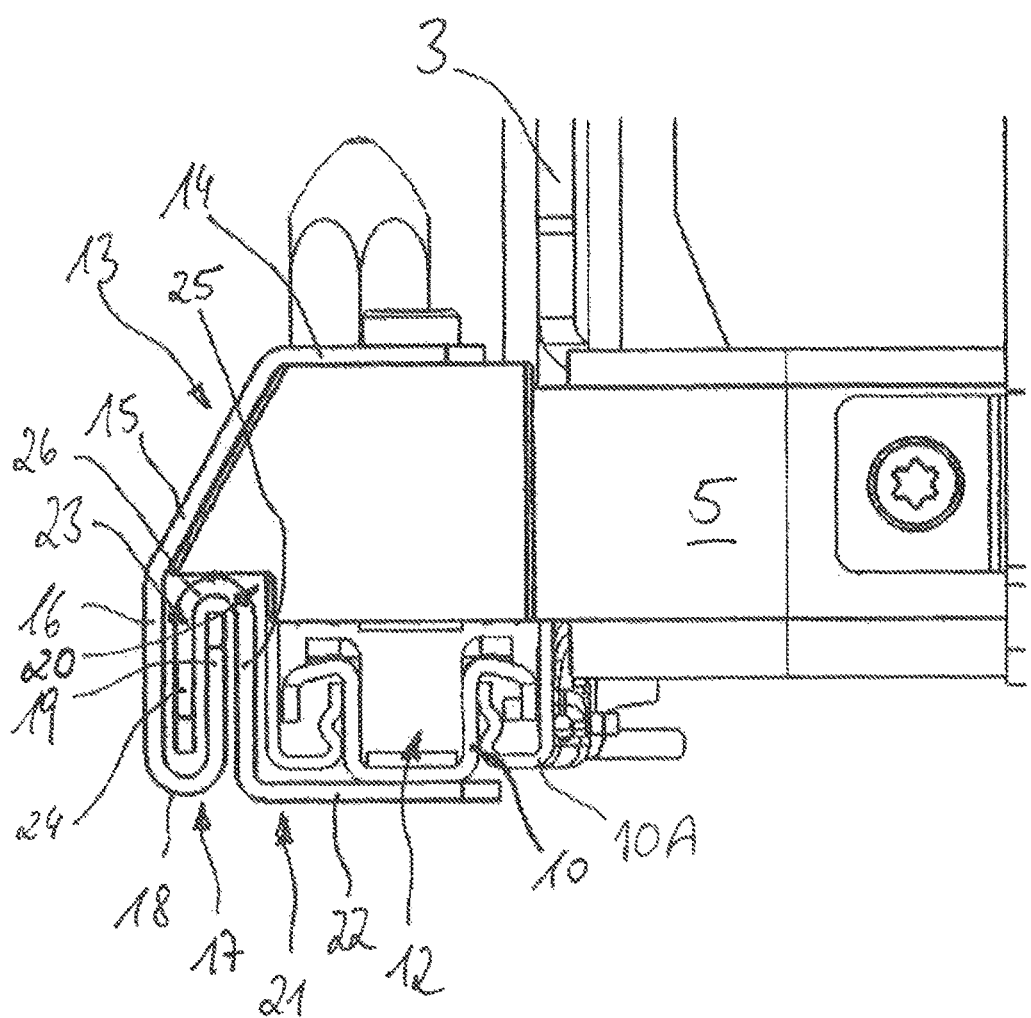

LOWER GUIDE FRAME OF A VERTICAL SUSPENSION SYSTEM, SLIDING SEAT GUIDE OF A VEHICLE SEAT, VERTICAL SUSPENSION SYSTEM FOR A VEHICLE SEAT, AND VEHICLE SEAT

CROSS-REFERENCE TO RELATED APPLICATIONS

This patent application claims the benefit of German Application number DE 10 2016 008379.4, filed Jul. 12, 2016, the content of which is incorporated by reference herein in its entirety.

BACKGROUND OF THE INVENTION

1. Field of Invention

The invention relates to a lower guide frame of a vertical suspension system, to a sliding seat guide of a vehicle seat, and to a vertical suspension system for a vehicle seat, which is a combination of the lower guide frame and the sliding seat guide, and to a vehicle seat having such a vertical suspension system.

2. Description of the Related Art

Seats having vertical suspension systems for coupling out harmful oscillations that are caused by the road usually have integrated three-point belt systems. The vehicle fastening points in this case are subject to a relative movement, which constitutes an unacceptable loss of comfort.

Belt and restraint systems become effective in dynamic acceleration or deceleration events. In this case, all forces that result from the mass action of the seat user must be introduced into the seat system through the belt system; this is in addition to the mass action of the seat system itself. All this must be reliably diverted by the seat system into the vehicle floor by degrees of freedom that are based on comfort, such as, according to the present application, by a vertical suspension system and a horizontal adjustment by means of a sliding seat guide. The state of the art includes check belt arrangements for transferring the occurring forces in the vertical suspension system and for height limitation.

Conventional modular sliding seat guides consist of an appropriate combination of guide profiles, assigned respectively to the right and left under the vehicle seat, that in a complementary manner form a form-fit and thereby constitute the interface, having a possibility for adjustment in a horizontal direction between the vehicle seat and the vehicle floor.

For standard applications, these sliding seat guides are always adequate. Transfers of force for greater loads, partly resulting from legal requirements, partly from customer demands, require more extensive design measures for the transfer of force.

This system for the transfer of force appropriately improves the efficiency of conventional guide systems by simple, complementary, modular components that can be mounted and assigned in a modular manner to a vehicle seat, or commercial vehicle seat.

For this purpose, in known systems, additional check profiles are mounted to improve the efficiency, and thereby to fulfil all requirements. Furthermore, in the case of application on suspension systems, the rail-side frame profiles of the lower guide frame are preferably also reinforced with separate profiles, as a reinforcing part for these increased demands. Consequently, although the two loaded components per se are improved in their efficiency, the interface between the components nevertheless remains a weak point.

The known systems improve the force transfer behaviour of the sliding seat guide, i.e. the device that enables the horizontal position of the seat in the vehicle, by means of additional components. The vehicle user can thereby select the desired seat position, relative to the operating elements, in dependence on his size and perception of comfort. All introduced forces must be diverted through this structural element with an assigned degree of freedom. The additional components, due to their design, can only maximally use the structural height of the sliding seat guide, and are therefore efficient only to a limited extent.

SUMMARY OF THE INVENTION

An object of the invention is therefore to improve the efficiency of such guide system for the transfer of force, in that conventional guide systems—or the constituent parts thereof—are modified by simple, modular components.

This object is achieved by a lower guide frame for a vertical suspension system of a vehicle seat, having the features of claim 1. The first reinforcing profile according to the invention, by means of a single part, which extends from the upper side of the slide to just above the vehicle floor, and is thus also disposed laterally along a guide rail of a sliding seat guide that is assigned to the slide, achieves the effect that the reinforcing profile can be brought into engagement with a mating piece on the guide rail. It is thereby possible for force to be diverted over a large area from the lower guide frame into the sliding seat guide, and thus into the vehicle floor. As a result, the material thickness for the reinforcing profile can be reduced in comparison with the state of the art.

An advantageous development of the invention provides that, adjoining the lower end of the vertical portion, there is a profile portion, which transitions, via a bent connecting portion, into a vertical region, such that the vertical portion, with the connecting portion and the vertical region, together produce an upwardly open first channel. This simple profile shape makes it possible, instead of using the material used hitherto, in the form of metal plate, also to use high strength and ultra-high strength materials such as, for example, DP-W 700. The shape of an (elongate) channel results in a large region of overlap with the assigned guide profile of the guide rail, such that an efficient transfer of force can be effected over the entire adjustment path of the sliding seat guide.

A further advantageous development of the invention provides that the upper end of the profile portion ends beneath the upper end of the vertical portion. Longer functional limbs are thereby possible, as a result of which better form-fit characteristics are achieved between the reinforcing profiles on the slide and the guide profiles on the guide rail. Moreover, owing to the greater structural height, a greater section modulus is rendered possible.

A further advantageous development of the invention provides that, attached to the upper side of the other slide, there is a further reinforcing profile, which is realized in a mirror-inverted manner, with respect to a vertical plane that extends in the longitudinal direction of the vehicle, in relation to the above-mentioned reinforcing profile. It is thereby possible for force to be introduced on both slides—symmetrically—into the sliding seat guide.

A further advantageous development of the invention provides that one end and/or the other end of the lower crosspiece is/are designed such that the reinforcing profile, or the two reinforcing profiles, bears or bear in a form-fitting manner, with their respective horizontal portion and with their respective oblique portion, against the respectively assigned end of the lower crosspiece. An absolute, direct transfer of force is thereby also obtained, as a result of the reinforcing profile bearing in a form-fitting manner against the upper side of the lower crosspiece. Such a design can be assembled in the conventional production process. Moreover, by means of the frame-side reinforcing profiles, which, in combination with the assigned end of the (frame-side) lower crosspiece, form a fixed joint, the forces, introduced there, of a check belt that is connected, by its lower end, to the lower crosspiece, can be diverted reliably and directly—via the guide profiles—into the vehicle floor.

The object is also achieved by a sliding seat guide having the features of claim 6. Since the guide profile is mounted between the vehicle floor and the guide rail, the known assembly process can be maintained. Owing to the simple design of the vertical part of the guide profile—as a two-dimensionally shaped profile—the latter can also be produced by means of favourable production methods such as, for example, a roll-profiling method.

An advantageous development of the invention provides that, attached to the underside of the other guide rail, there is a further guide profile, which is realized in a mirror-inverted manner, with respect to a vertical plane that extends in the longitudinal direction of the vehicle, in relation to the above-mentioned guide profile. It is thereby possible for force to be introduced on both guide rails—symmetrically—from the lower guide frame into the sliding seat guide.

The object is also achieved by a vertical suspension system for a vehicle seat, having a lower guide frame according to the invention, described above, which is connected to an upper guide frame via a lever arrangement, and is connected to a sliding seat guide according to the invention, described above (claim 8). As a result of the joint between lower guide frame according to the invention and sliding seat guide, the advantages stated above in relation to these two parts are achieved.

A further advantageous development of the invention provides that the vertical portion of the reinforcing profile is in engagement with the vertical part of the guide profile, and/or the vertical portion of the further reinforcing profile is in engagement with the vertical part of the further guide profile, in particular in that the first channel and the first guide channel and/or the second channel and the second guide channel engage in each other. Owing to their simple geometric shape, in the assembled state, the reinforcing profiles and guide profiles can be positioned with adequate distance in relation to each other, in order to avoid mutual contact, friction and noise generation. Moreover, owing to the profile arrangement of the reinforcing profiles and guide profiles that are respectively in engagement with each other, the required structural space of such a vertical suspension system according to the invention is less, relative to the track dimension.

The object is also achieved by a vehicle seat having a vertical suspension system according to the invention described above (claim 10). In this case, the advantages indicated above in relation to the vertical suspension system are achieved.

BRIEF DESCRIPTION OF THE DRAWINGS

Further advantages and details of the invention are explained on the basis of the embodiment example represented in the figures in which:

FIG. 6 is an enlarged detail of the left-hand lower part of FIG. 5.

DETAILED DESCRIPTION THE INVENTION

Figure 1:
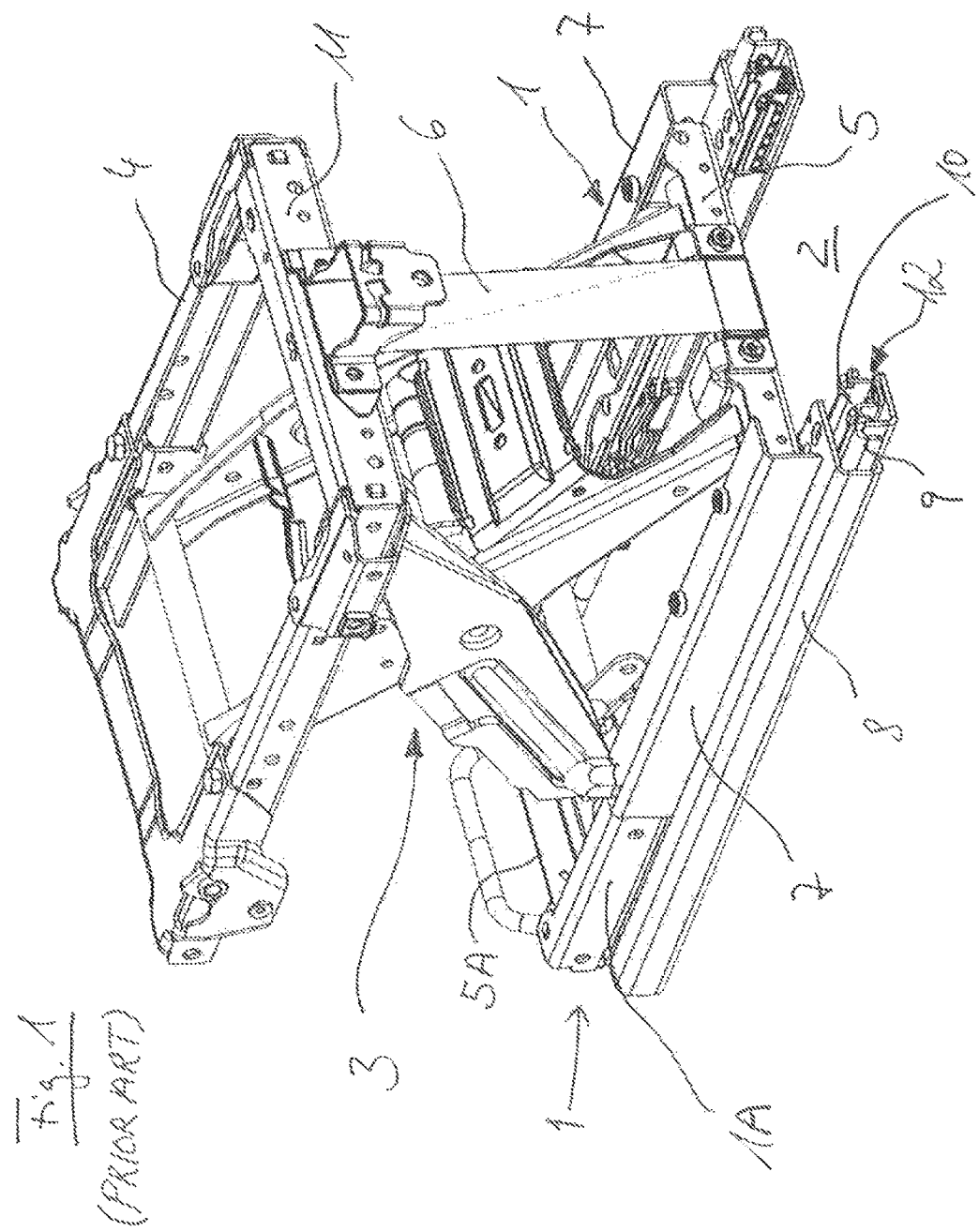
FIG. 1 is an isometric view of a known suspension system with sliding seat guide.
Figure 2:
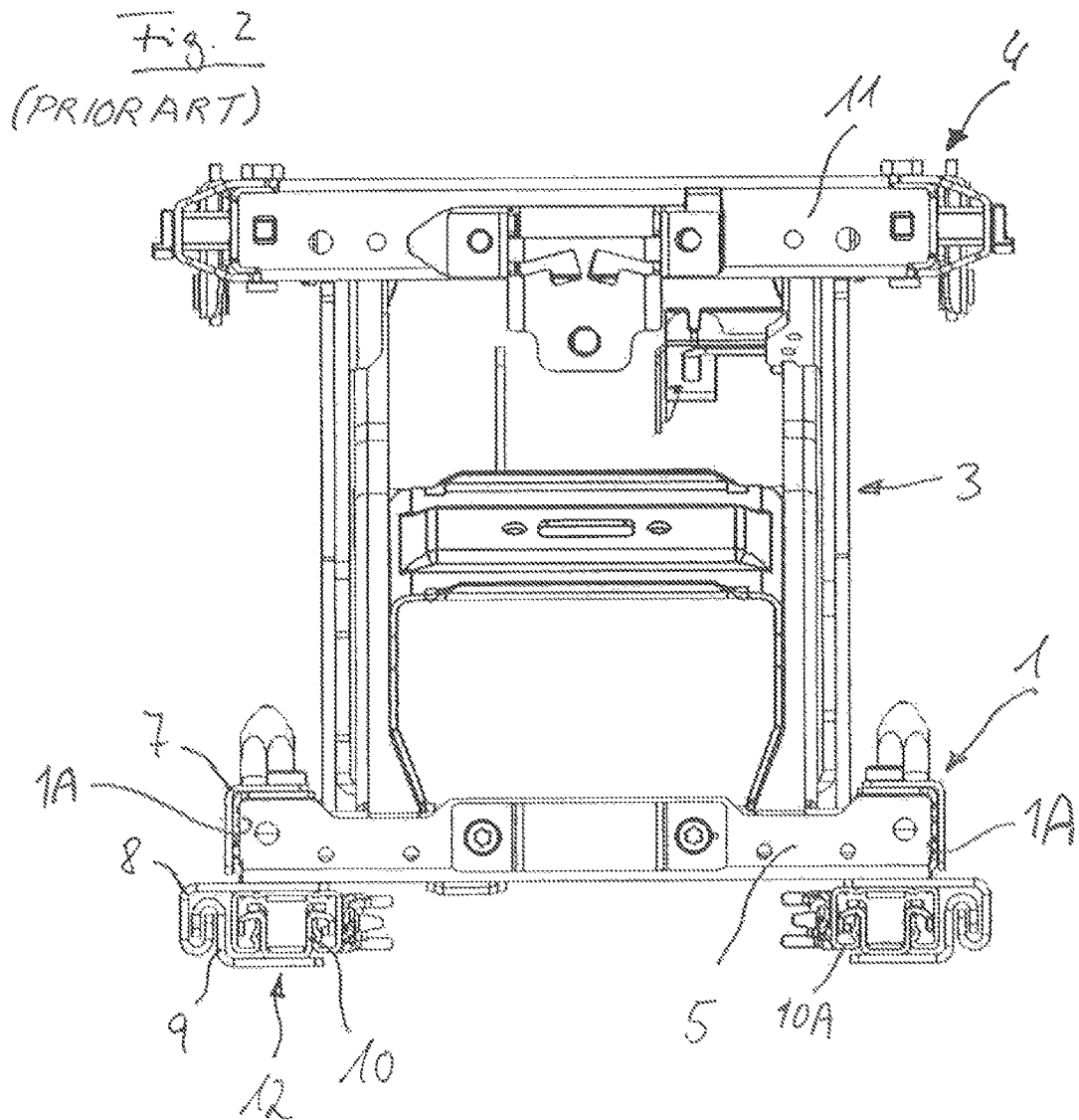
FIG. 2 is a rear view of the device from FIG. 1.
Figure 3:
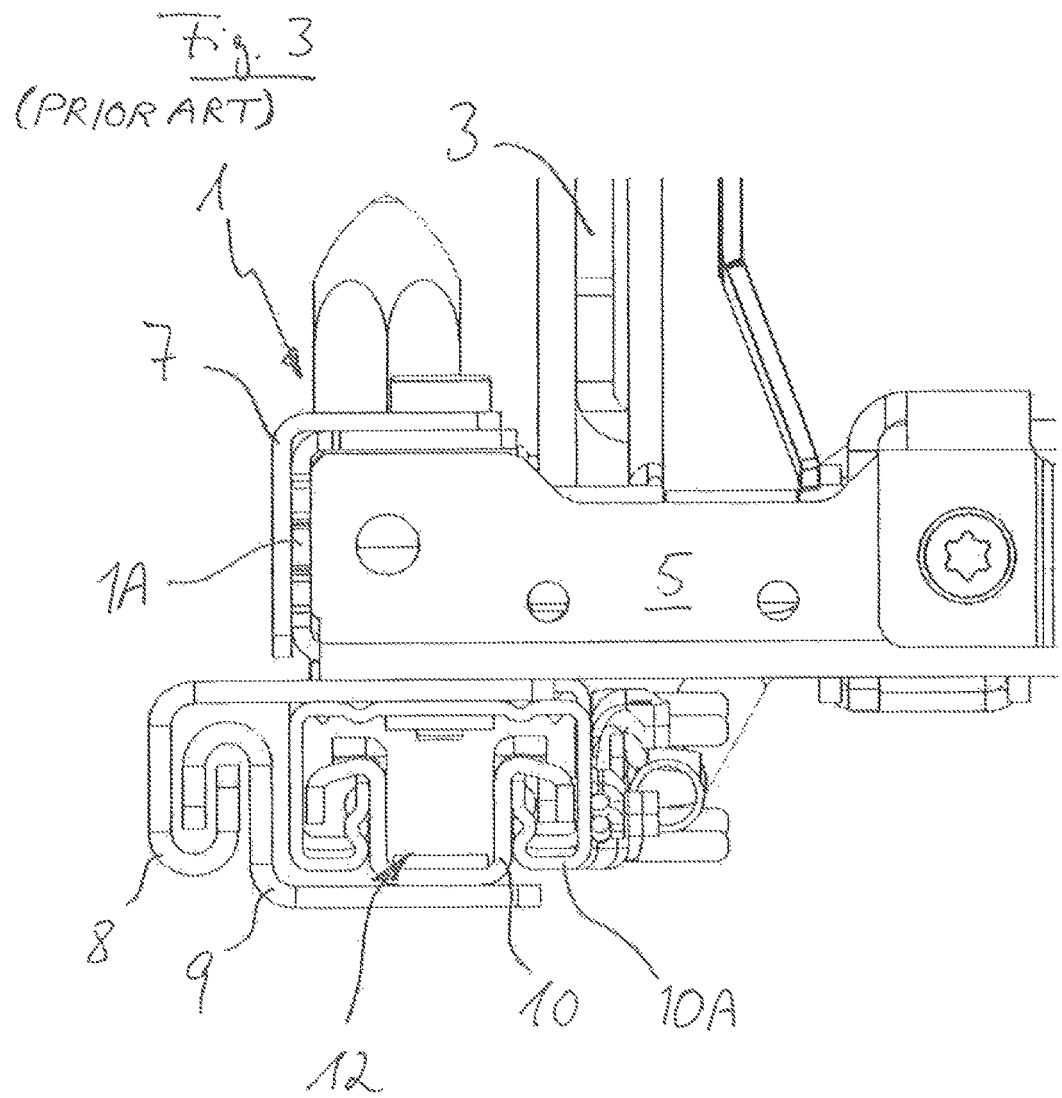
FIG. 3 is an enlarged detail of the left-hand lower part of FIG. 2.

Represented in FIGS. 1 to 3 is a vertical suspension system for a vehicle seat, together with a sliding seat guide according to the state of the art, in engagement therewith. In the following, unless the specifically mentioned figure is meant individually, reference is made to these three figures as a whole.

Represented in an isometric view from rear left in FIG. 1 is a vertical suspension system for a vehicle seat, which is disposed in a longitudinally displaceable manner in a slidable seat guide assembly 12 that is fixedly connected to a vehicle floor 2. In FIG. 1, a pair of slidable seat guide assemblies 12 are illustratively shown in a spaced-apart and parallel arrangement, and connected to each other via the lower crosspiece 5. Each slidable seat guide assembly 12 includes a stationary guide rail 10 fixedly mounted to the vehicle floor 2 and a slidable guide rail 10A mounted over and slidebly interfacing with the stationary guide rail 10. The vertical suspension system has an upper guide frame 4, which is connected in a known manner to a lower guide frame 1 by means of a lever arrangement 3. In addition, the upper guide frame 4 and lower guide frame 1 are also connected to each other in a known manner via a check belt 6, which is fastened to an upper crosspiece 11 and a lower crosspiece 5. The lower guide frame 1 is formed by first and second lateral frame members 1A and crosspieces 5 and 5A. The first and second lateral frame members 1A illustratively extend in a longitudinal direction of the vehicle and are spaced-apart and parallel with each other. The lower crosspiece 5 and forward lower crosspiece 5A extend normal between opposing end portions of the first and second lateral frames members 1A to define a substantially rectangular shaped lower guide frame 1, as illustratively shown in FIG. 1.

To enable greater forces to be transferred, there is a respective reinforcing metal plate 7 mounted on both sides of the lower guide frame 1. Each reinforcing metal plate 7 is substantially L-shaped in its cross section and superposes at the rear end the upper side and outer face of the lower guide frame 1.

Attached to the underside of the lower guide frame 1, on each side, is a frame-side profile 8, which is realized like a channel in the respective side region. This channel engages in a downwardly open, channel-type portion in the side region of a floor-side profile 9, which is directly fastened on the vehicle floor 2. Each lateral frame member 1A has mounted thereunder a slidable seat guide assembly 12, each of which including a stationary guide rail 10 and a slidable guide rail 10A. The stationary guide rail 10 is also fixedly mounted to the vehicle floor 2. The slidable guide rail 10A is fixedly mounted to the underside of a corresponding one of the lateral frame members 1A via the frame-side profile 8. The slidable guide rail 10A slidably interfaces with the stationary guide rail 10, thereby facilitating movement of the lower guide frame 1 (and the vehicle seat when attached) in a forward and rearward direction relative to the stationary guide rails 10 and the floor-side profiles 9 mounted to the vehicle floor.

If the vehicle seat, in this case the vertical suspension system as a constituent part thereof, is displaced in the longitudinal direction of the vehicle (perpendicularly in relation to the plane of the drawing in FIGS. 2 and 3), the channel-type portions of the frame-side profile 8 and floor-side profile 9 move relative to each other. The longitudinal adjustment can be performed quite easily without being inhibited by friction between the two profiles 8, 9, since these two profiles 8, 9 do not touch, only their respective free ends engaging in each other instead. Owing to the two profiles 8, 9 being in engagement with each other over a long length, the horizontal forces acting on the vertical suspension system can be diverted effectively into the vehicle floor 2.

Figure 4:
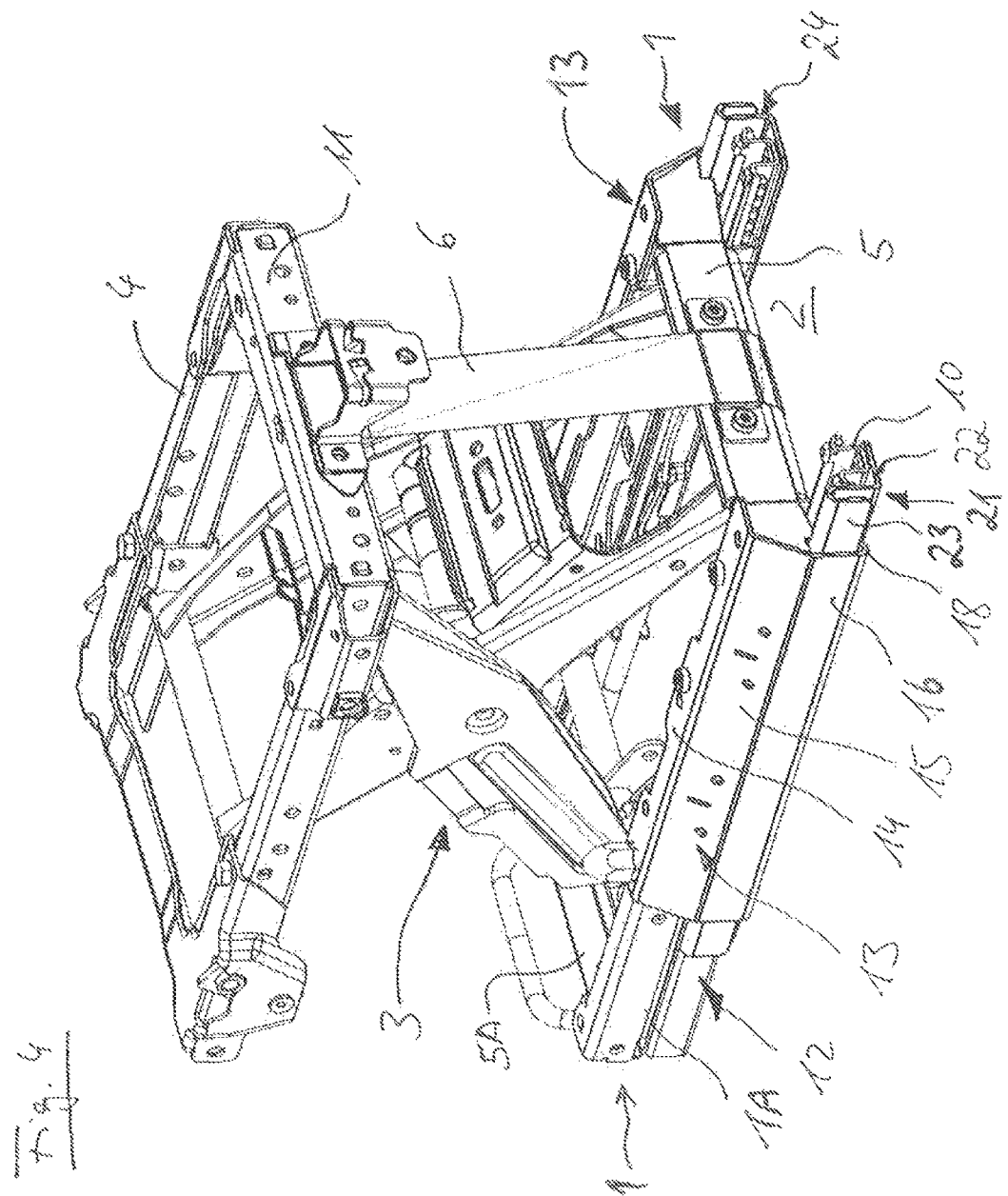
FIG. 4 is an isometric view of a suspension system according to the invention with sliding seat guide.
Figure 5:
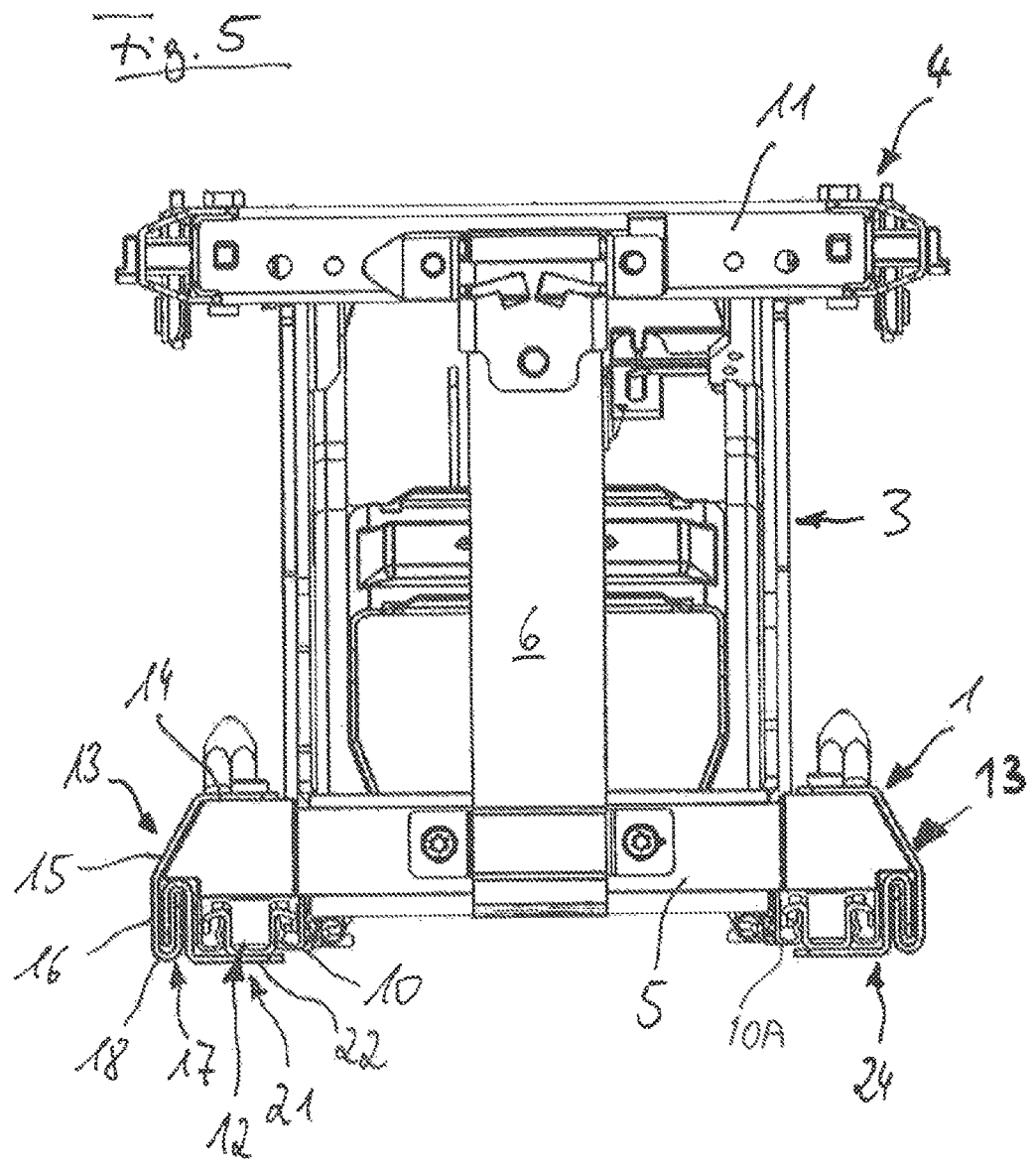
FIG. 5 is a rear view of the device according to the invention from FIG. 4.

FIGS. 4 to 6 represent an embodiment example of a combination, according to the invention, of a vertical suspension system according to the invention and a sliding seat guide 12 according to the invention. In this case, also—as already above with respect to FIGS. 1 to 3—in the following, unless the specifically mentioned figure is meant individually, reference is made to these three figures as a whole.

In FIG. 4, the complete system is represented from the same direction as the device in FIG. 1. In FIG. 5, the complete system is represented as viewed from the rear (in FIG. 4, this is from the rear right direction). FIG. 6 is an enlarged detail in the region of the left-hand guide rail 10.

In the following, only the differences in relation to the state of the art represented in FIGS. 1 to 3 are explained. These consist only in the design of the parts that are designated as a reinforcing metal plate 7, frame-side profile 8 and floor-side profile 9 in the state of the art, and in the shape of the two ends of the lower crosspiece 5. The invention has parts realized in a mirror-inverted manner on both sides. It therefore suffices to explain only one side—in this case, only the left-hand side is described.

In the case of the invention, the part designated as a floor-side profile 9 in the state of the art has been replaced by a guide profile 21. The guide profile 21 has a horizontal part 22, adjoining which, outside the guide rail 10, there is a vertical part 23. The vertical part 23 has two vertical sub-portions 24, 25, which are connected to each other at their upper ends via a bent region 26. The second vertical sub-portion 25 in this case adjoins the horizontal part 22. The vertical region 23 thus forms a downwardly open channel. The bent region 26 is located higher than in the case of an item according to the state of the art (see FIG. 3), and protrudes significantly over the upper end of the guide rail 10.

At its ends, the lower crosspiece 5 has a trapezoidal shape, out of which a recess 20 is taken in the region of the outer lower corner. The bent region 26 of the guide profile 21 is disposed, at a slight distance, in this recess 20.

In the invention, the parts, reinforcing metal plate 7 and frame-side profile 8, known from the state of the art have been replaced by a single part, a reinforcing profile 13. The reinforcing profile 13 has a horizontal portion 14, which is connected to the upper side of the lateral guide member 1A. Adjoining the horizontal portion 14 there is an oblique portion 15, which runs obliquely outwards, parallel to the outer end of the lower crosspiece 5. In the region of the recess 20, the oblique portion 15 transitions into a vertical portion 16, adjoining which, in its lower region, there is a bent connecting portion 18. Adjoining the connecting portion 18, in turn, there is a vertical region 19. The vertical portion 16, connecting portion 18 and vertical region 19 together form a channel-type profile portion 17, which is open upwards.

The vertical portion 16 of the reinforcing profile 13 and the vertical part 23 of the guide profile 21 are shaped such that the channels respectively formed by them engage in each other in such a manner that their constituent parts are disposed at a slight distance apart from each other. Thus, in comparison with the state of the art, a significantly greater overlap region is obtained, in which the aforementioned parts engage in each other, resulting in an efficient transfer of the forces to be diverted into the vehicle floor. Moreover, in comparison with the state of the art, there is a saving of a part, since the reinforcing profile 13 replaces the two parts, reinforcing metal plate 7 and frame side profile 8, resulting in saving of material and easier production and assembly of the system.

In the case of an item according to the invention, additional uses such as, for example, a bellows mounting, are also easily possible.

Overall, it may be stated that the following advantages are achieved by the invention:

The greater structural height renders possible a greater section modulus; a reduction of the thickness of material; better form-fit characteristics, owing to longer functional limbs of the two form-fit profiles (profile portion 17 and vertical part 23); favourable production methods such as, for example, roll-profiling, owing to simple, two-dimensionally shaped form-fit profiles 17, 23; the structural space required for disposing the form-fit profiles 17, 23 is less, relative to the track dimension; the increased section modulus of the form-fit profiles 17, 23 and the possible simple production methods, as well as the simple profile shape, in addition to reducing the metal plate thickness additionally also render possible the use of high strength and ultra-high strength steel materials; an absolutely direct transfer of force, the (upper) reinforcing profile 13, with the horizontal portion 14 plus oblique portion 15, reinforcing the lower guide frame 1, and being able to be assembled in the conventional production process; the form-fit profiles 17, 23 are positioned with sufficient distance, in order to avoid contact, friction and noise generation; the form-fit regions of the form-fit profiles 17, 23 have a sufficiently large overlap region for the efficient transfer of force over the entire adjustment path of the sliding seat guide 12; the rows of screwed connections on the lower guide frame 1 and on the rail-side floor fastening of the guide profile 21 are located above one another, or are offset laterally only to a negligible extent, such that the introduction of force into the interlocking region periodically causes a clockwise or anticlockwise moment; this results from the described distance and the effective force, the resultant transverse force resulting in the profile arrangement being supported on the sliding seat guide 12 and on the lower guide frame 1.

Although an exemplary description of the invention has been set forth above to enable those of ordinary skill in the art to make and use the invention, that description should not be construed to limit the invention, and various modifications and variations can be made to the description without departing from the scope of the invention, as will be understood by those with ordinary skill in the art, and the scope thereof is determined by the claims that follow.

LIST OF REFERENCES 1. lower guide frame
2. vehicle floor 3. lever arrangement
4. upper guide frame
5. lower crosspiece
6. check belt
7. reinforcing metal plate
8. frame-side profile
9. floor-side profile
10. guide rail
11. upper crosspiece
12. sliding seat guide
13. reinforcing profile
14. horizontal portion
15. oblique portion
16. vertical portion
17. profile portion
18. connecting portion
19. vertical region
20. recess
21. guide profile
22. horizontal part
23. vertical part
24. first vertical sub-portion
25. second vertical sub-portion
26. bent region

I claim:

1. A lower guide frame for a vertical suspension system of a vehicle seat, the lower guide frame being attached to a slidable seat guide assembly which in turn is configured for mounting to a floor of a vehicle, the lower guide frame comprising:
a first lateral frame member and, spaced apart and parallel thereto, a second lateral frame member, which are connected to each other via a lower crosspiece having a first end and an opposing second end, the first end including a lower surface with a first recess; and
a first one-piece reinforcing profile including a horizontal portion, an oblique portion and a vertical portion, the horizontal portion being positioned over an upper surface of the first lateral frame member and the lower cross piece; the oblique portion being straight and extending between and continuously adjoining the horizontal portion to the vertical portion, and oriented obliquely downwards and outwards with respect to the upper surface of the first lateral frame member, wherein the oblique portion transitions to the vertical portion directly lateral to the first recess; and the vertical portion extending downward from the oblique portion and, in an assembled state of the lower guide frame, a lower end of the downward extending vertical portion extends lateral to the slidable seat guide assembly and just above the vehicle floor.

2. The lower guide frame according to claim 1, wherein the lower end-of the vertical portion transitions, via a bent connecting portion, from the downwardly extending vertical portion into a vertical region, such that the vertical portion, the bent connecting portion and the vertical region define an upwardly open first channel.

3. The lower guide frame according to claim 2, wherein the vertical portion, bent connecting portion and vertical region defining the upwardly open first channel is U-shaped, and in which a distal end of the vertical region is positioned lower than an upper end of the vertical portion.

4. The lower guide frame according to claim 1 further comprising a second one-piece reinforcing profile attached to an upper surface of the second lateral frame member and the second end of the lower cross piece, the second end of the lower cross piece including a lower surface with a recess, and the first and second one-piece reinforcing profiles being configured in a mirror-inverted manner with respect to a vertical plane that extends in a longitudinal direction of the vehicle.

5. The lower guide frame according to claim 1, wherein the first end of the lower crosspiece is configured to conform in shape with the horizontal and oblique portions of and positioned adjacent to the first reinforcing profile.

6. A vertical suspension system for the vehicle seat having the lower guide frame according to claim 1, comprising an upper guide frame connected to the lower guide frame via a lever arrangement, the slidable seat guide assembly attached to an underside of the first lateral frame member, wherein the slidable seat guide assembly includes a first stationary guide rail configured for mounting to the floor of the vehicle and a first slidable guide rail mounted to an underside of the first lateral frame member and slidably interfacing with the stationary guide rail, wherein attached at an underside of the first stationary guide rail is a guide profile having a horizontal part positioned between the vehicle floor and the first guide rail, and adjoining the horizontal part is a vertical part having a shape of a downwardly open first guide channel formed by two, mutually-parallel, vertical sub-portions each having an upper end connected to each other via a bent region, wherein the bent region is positioned above an upper end of the first guide rail.

7. The vertical suspension system according to claim 6, wherein the vertical portion of the first one-piece reinforcing profile is in engagement with the vertical part of the first guide profile.

8. A vehicle seat having a vertical suspension system according to claim 6.

9. The vertical suspension system according to claim 7, wherein the upwardly open first channel of the first one-piece reinforcing profile interfaces with the downwardly open first guide channel of the first guide profile.

10. The vertical suspension system according to claim 6, wherein the slidable seat guide assembly further includes a second stationary guide rail mounted to the vehicle floor and a second slidable guide rail mounted to an underside of the second lateral frame member, and wherein attached at an underside of the second stationary guide rail is a second guide profile having a horizontal part positioned between the vehicle floor and the secondary stationary guide rail, and adjoining the horizontal part is a vertical part having a shape of a downwardly open first guide channel formed by two, mutually-parallel, vertical sub-portions each having an upper end connected to each other via a bent region, wherein the bent region is positioned above an upper end of the corresponding second stationary guide rail.

11. The vertical suspension system according to claim 10, wherein the vertical portion of the second one-piece reinforcing profile interfaces with the vertical part of the second guide profile.

12. The vertical suspension system according to claim 11, wherein the upwardly open second channel of the second one-piece reinforcing profile interfaces with the downwardly open second guide channel of the second guide profile.

13. A vehicle seat having a vertical suspension system according to claim 10.

14. The lower guide frame according to claim 4, wherein the second opposing end of the lower crosspiece is configured to conform in shape with the horizontal and oblique portions of and positioned adjacent to the second one-piece reinforcing profile.

15. The lower guide frame according to claim 1, wherein the horizontal portion is directly attached to an upper surface of the first lateral frame member.

16. The lower guide frame according to claim 1, wherein the oblique portion is substantially linear in shape.

17. The lower guide frame according to claim 16, wherein the oblique portion extends from the horizontal portion a distance proximate a lower surface of the first lateral frame member.

18. A lower guide frame for a vertical suspension system of a vehicle seat, the lower guide frame being attached to a slidable seat guide assembly which in turn is configured for mounting to a floor of a vehicle, the lower guide frame comprising:
- a first lateral frame member and, spaced apart and parallel thereto, a second lateral frame member, which are connected to each other via a lower crosspiece having opposing first and second ends, the first end including a lower surface with a first recess; and
- a first reinforcing profile including a horizontal portion, an oblique portion and a vertical portion, the horizontal portion being directly attached in a horizontal orientation to an upper surface of the first lateral frame member, the oblique portion being straight and having one end directly attached to the horizontal portion and an opposing second end directly attached to the vertical portion, the straight oblique portion being and oriented obliquely downwards and outwards with respect to the upper surface of the first lateral frame member; and the vertical portion extending downward from the second end of the oblique portion and, in an assembled state of the lower guide frame, the vertical portion extending and terminating lateral to the slidable seat guide assembly and having a bottom portion aligned vertically below the first recess and extending in close proximity just above the vehicle floor.

19. The lower guide frame according to claim 2, wherein the upwardly open first channel is aligned vertically below the first recess of the first end of the crosspiece.

20. The vertical suspension system according to claim 6, wherein the downwardly open first guide channel is aligned vertically below the first recess of the first end of the crosspiece.

21. The vertical suspension system according to claim 6, wherein the bent region of the downwardly open first guide channel is positioned within the first recess of the first end of the crosspiece.

* * * * *